United States Patent [19]

Allen et al.

[11] Patent Number: 4,542,658
[45] Date of Patent: Sep. 24, 1985

[54] TORQUE MEASURING DEVICE

[75] Inventors: Kenneth D. Allen, Mobile; James W. Brogdon, Daphne; John S. Barton, Mobile, all of Ala.; Raymond J. Hicks, Llandrindod Wells, England

[73] Assignee: Teledyne Industries, Inc., Los Angeles, Calif.

[21] Appl. No.: 571,377

[22] Filed: Jan. 16, 1984

[51] Int. Cl.[4] .............................................. G01L 3/14
[52] U.S. Cl. .................................................. 73/862.31
[58] Field of Search ........................ 73/862.31, 862.29

[56] References Cited

U.S. PATENT DOCUMENTS

| | | | |
|---|---|---|---|
| 2,385,005 | 9/1945 | Langer | 73/862.31 X |
| 2,518,708 | 8/1950 | Moore | 73/862.31 X |
| 2,562,710 | 7/1951 | Gallo et al. | 73/862.31 |
| 3,385,136 | 5/1968 | Berry et al. | 73/862.31 X |
| 4,055,080 | 10/1977 | Farr et al. | 73/862.31 X |

FOREIGN PATENT DOCUMENTS 0130690 4/1978 German Democratic Rep. ................................. 73/862.29

*Primary Examiner*—Charles A. Ruehl
*Attorney, Agent, or Firm*—Gifford, VanOphem, Sheridan, Sprinkle & Nabozny

[57] ABSTRACT

A torque measuring device is provided for measuring the engine torque of an engine having an output shaft and connecting through a gear box having a planetary gear arrangement to a load. The torque measuring device comprises a hub having an axis and supporting the stationary member of the planetary gear arrangement coaxial with the axis of the hub. An annulus is secured to and supports the gear box housing and is also secured to the hub by a plurality of circumferentially spaced spokes extending between the annulus and the hub and tangent to some circle coaxial to the hub. As the torque applied to the planetary gear arrangement increases, the hub rotates from its at rest position deflecting the spokes in proportion to the reaction torque of the stationary members. An arm extending outwardly from the hub cooperates with a position transducer to measure the amount of rotation of the hub with respect to the annulus and thus the torque on the planetary gear arrangement.

8 Claims, 5 Drawing Figures

U.S. Patent    Sep. 24, 1985    Sheet 3 of 3    4,542,658 mensioned so that its outermost free end 56 protrudes outwardly from the gear box 14.

With reference still to FIGS. 3 and 4, a cover 58 is positioned over and encloses the outer free end 56 of the arm 50 and the cover 58 is secured to the gear box 14 by a fastener 60. A linear position transducer 62 (FIG. 3) is secured to the cover 58 and has a movable transducer head 64 which protrudes into the interior of the cover 58 and abuts against one side of the free end 56 of the arm 50. The transducer 62 with its head 68 extends in a direction substantially tangential with respect to the axis of the hub 22. The position transducer 62 is conventional in construction and generates an output signal on a line 66 proportional to the linear position of the transducer head 64. This output line 66, in turn, forms an input to an indicator circuit 68 which produces a signal indicative of the linear position of the transducer head 64 with respect to the body of the transducer 62.

With reference now to FIGS. 1 and 5, in operation the torque on the engine output shaft 12 is transmitted through and multiplied by the planetary gear arrangement 18 and is reacted at the stationary planet spindle 34. The planet spindle 34, in turn, transmits this torque to the hub 22.

As best shown in FIG. 5, as the torque on the hub 22 from the planetary gear arrangement increases, the spokes 42 deflect as shown in exaggerated form in phantom line in FIG. 5. In doing so, the hub 22 rotates slightly clockwise from its at rest position as viewed from FIG. 5 simultaneously rotating the arm 50 in the clockwise direction. The arm 50 thus moves the head 64 of the transducer 62 in an amount proportional to the torque on the planetary gear arrangement 18. Consequently, the movement of the transducer head 64 is proportional to the torque through the planetary gear system 18 and thus to the torque on the engine output shaft 12 and this torque is signalled to the engine operator by the indicator circuit 68.

Alternatively, a strain gage 100 on one spoke 42 (FIG. 2) or a proximity pickup can be used in lieu of the transducer 62.

From the foregoing, it can be seen that the torque measuring device of the present invention provides a simple, effective and inexpensive means for measuring the torque between an engine and its load. An important feature of the present invention is that the torque measuring device not only forms the planetary gear carrier for the planetary gear arrangement 18 but also a support for the gear box 14. Since the torque measuring device simply replaces other components already present within the gear box, the device of the present invention adds little, if any, weight to the overall system.

Having described our invention, however, many modifications thereto will become apparent to those skilled in the art to which it pertains without deviation from the spirit of the invention as defined by the scope of the appended claims.

I claim:

1. For use in conjunction with a rotatable shaft mechanically connected through a gearing arrangement to a load, said gearing arrangement comprising at least two gears contained within a housing, a device for measuring torque on the shaft comprising:
    a hub having an axis, at least one gear from the gearing arrangement being rotatably mounted to said hub at a position spaced from said hub axis,
    an annulus secured to said housing,
    means for coaxially securing said annulus to said hub to permit limited rotational movement of said hub relative to said annulus in an amount proportional to the torque between said at least one gear and said housing,
    means for measuring said relative movement,
    means for indicating said measured movement, and,
    wherein said annulus has a larger daiameter than said hub, and wherein sai securing means comprises a plurality of spokes extending between and secured to said hub and said annulus, said spokes being circumferentially spaced from each other and tangent with respect to a circle coaxial with the axis of said hub.

2. The invention as defined in claim 1 wherein said hub, said annulus and said spokes are of a one-piece construction.

3. The invention as defined in claim 1 wherein said spokes are circumferentially equidistantly spaced from each other.

4. The invention as defined in claim 1 wherein a plurality of gears are rotatably mounted to said hub, said gears being circumferentially spaced around the axis of the hub.

5. The invention as defined in claim 4 wherein said hub includes an axial throughbore and wherein said shaft extends through said hub throughbore.

6. The invention as defined in claim 1 wherein said measuring means comprises a linear position transducer secured to said annulus and an elongated arm, said arm having one end secured to said hub and its other end positioned in abutment with said transducer.

7. The invention as defined in claim 6 wherein said transducer comprises a linear variable differential transformer.

8. The invention as defined in claim 1 wherein said measuring means comprises a strain gage secured to one spoke.

* * * * *

TORQUE MEASURING DEVICE

BACKGROUND OF THE INVENTION

I. Field of the Invention

The present invention relates generally to torque measuring devices and, more particularly, to a torque measuring device for measuring the load on the output from an engine.

II. Description of the Prior Art

There are a number of previously known devices for measuring the torque on a rotating shaft, such as a rotating shaft between an engine and a load. In many cases, a gearing system contained within a gear box changes the rotational speed between the engine and the load.

These previously known devices, however, are generally bulky, heavy and expensive in construction. In many applications, such as in aircraft, the weight and size of these prior devices presents a serious disadvantage, but these devices are required and must be used regardless of their disadvantages. Measurement of the engine torque in an aircraft is a highly desirable feature since a wide or rapid fluctuation in the engine torque is oftentimes indicative of engine malfunction. Torque measurement is also a requirement for the efficient and safe operation of the aircraft.

SUMMARY OF THE INVENTION

The present invention provides a torque measuring device which overcomes the above-mentioned disadvantages of the previously known devices.

In brief, the present invention comprises a hub having a axis which is coaxial with the output shaft from the engine. The stationary member of a planetary gear arrangement in the gearing system is rotatably supported by the hub at circumferentially spaced positions around the hub axis. Consequently, any torque load imposed upon the planetary gear system from the engine load is reacted by the hub.

An annulus is positioned coaxially around the hub and is secured to and forms a support for the gear box housing. The annulus, in turn, is secured to the hub by a plurality of circumferentially spaced spokes which extend from the annulus tangent to some circle coaxial to the hub. These spokes deflect or bend in an amount proportional to the torque applied to the hub and, in the preferred form of the invention, the hub, annulus and spokes are integrally formed.

An arm is secured to and extends radially outwardly from the hub and has an outer free end positioned adjacent the annulus. The free arm of the hub cooperates with a position transducer which generates an output signal proportional to the amount of movement of the arm and thus proportional to the torque applied to the hub.

BRIEF DESCRIPTION OF THE DRAWING

A better understanding of the present invention will be had upon reference to the following detailed description when read in conjunction with the accompanying drawing, wherein like references characters refer to like parts throughout the several views, and in which.

DETAILED DESCRIPTION OF A PREFERRED EMBODIMENT OF THE PRESENT INVENTION

Figure 1:
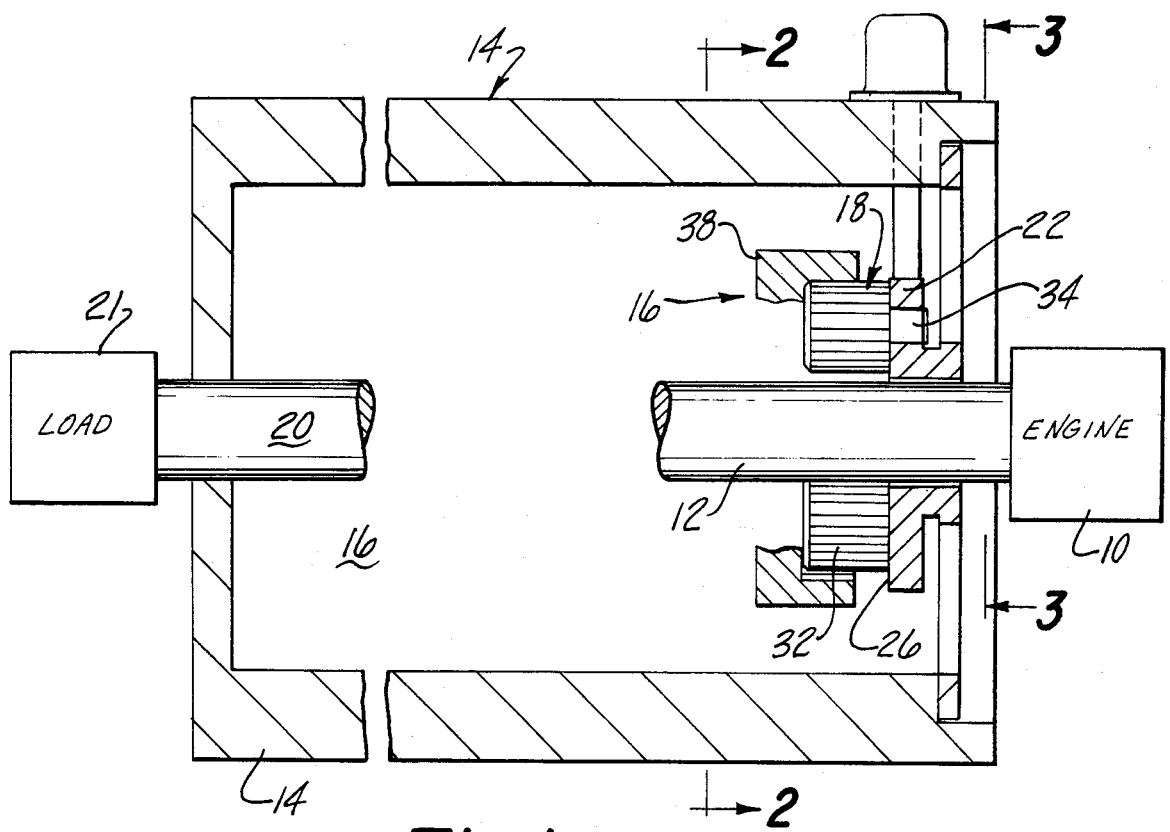
FIG. 1 is a diagrammatic view illustrating a preferred embodiment of the present invention.
Figure 2:
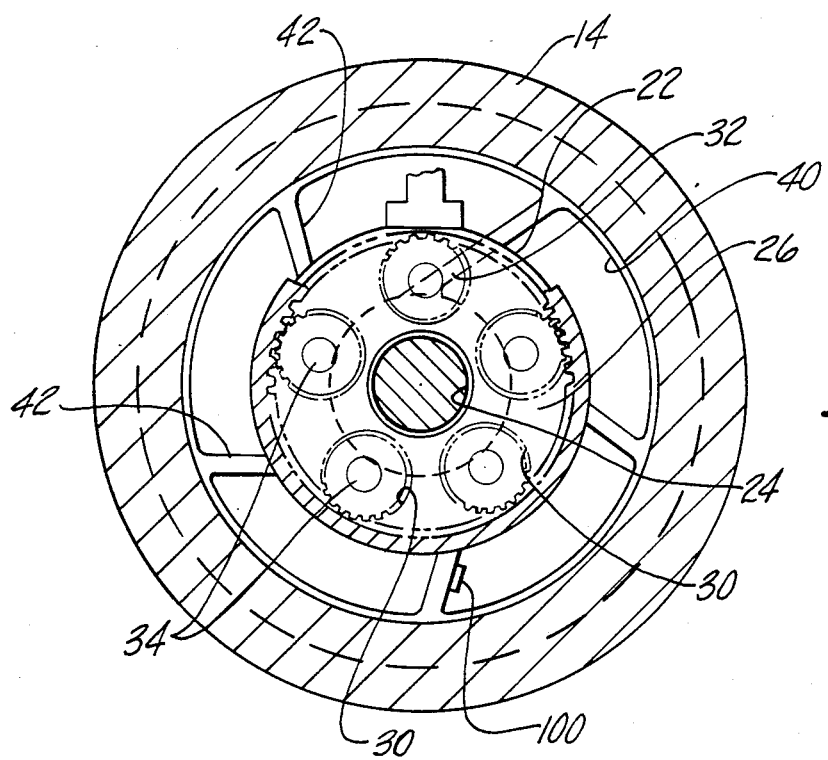
FIG. 2 is a view taken substantially along line 2—2 in FIG. 1 and enlarged for clarity.

With reference first to FIGS. 1 and 2, a preferred embodiment of the torque measuring device of the present invention is thereshown for use in conjunction with an engine 10 having an output shaft 12. The output shaft extends into a gear box 14 containing a gearing system 16. The gearing system 16 includes a planetary gear arrangement 18 which is mechanically coupled by the gearing system 16 to an output shaft 20 from the gear box 14. This output shaft 20 in turn drives an engine load 21, such as the propeller in an aircraft.

Figure 4:
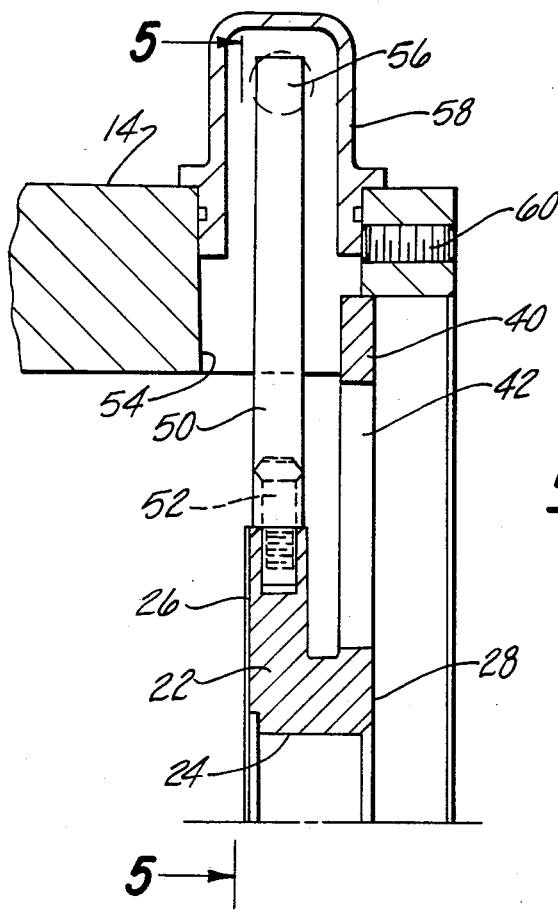
FIG. 4 is a longitudinal sectional view of a preferred embodiment of the invention and with parts removed for clairty.
Figure 5:
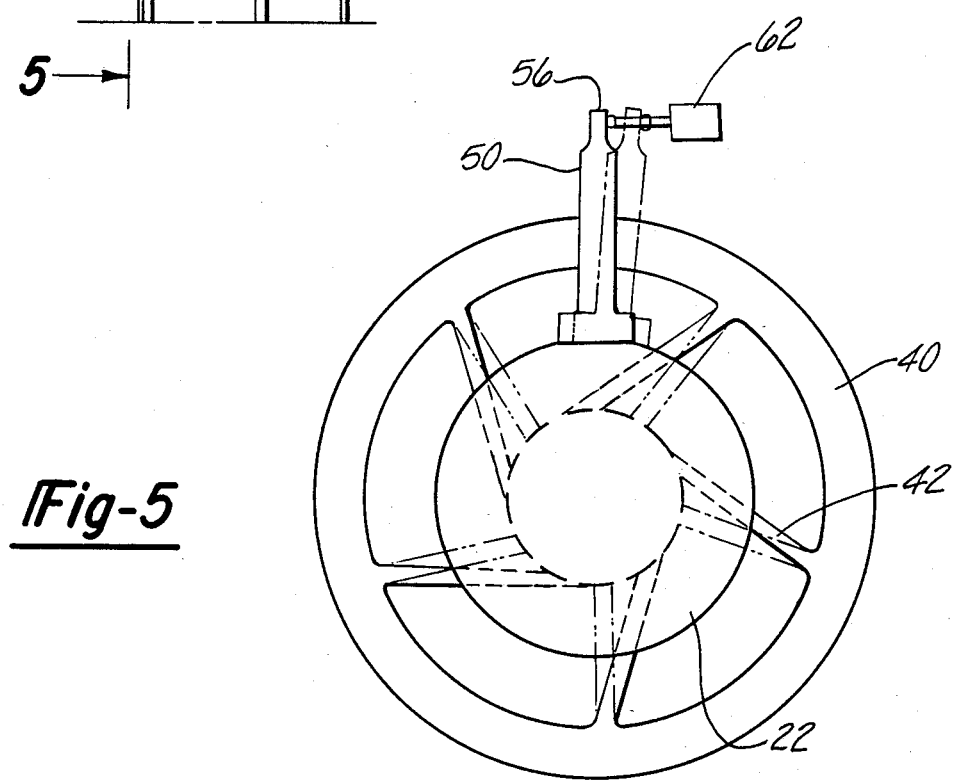
FIG. 5 is a fragmentary diagrammatic view illustrating the operation of the device of the present invention.

Referring now particularly to FIGS. 2 and 4, the torque measuring device comprises a disc shaped hub 22 having an axial throughbore 24 through which the engine output shaft 12 extends. Thus, one side 26 of the hub 22 faces towards the interior of the gear box 14 while its other side 28 faces towards the engine 10. As best shown in FIG. 1, the hub 22 is substantially coaxial with the engine output shaft 12.

With reference now particularly to FIG. 2, the hub 22 includes a plurality of circular pockets 30 formed on its inner face 26 so that the pockets 30 are both radially and circumferentially equidistantly spaced from the axis of the hub 22. As shown in FIG. 2, five such pockets 30 are formed in the hub face 26 although fewer or more pockets 30 can be provided as desired.

With reference now to FIGS. 1 and 2, one planetary gear 32 is rotatably mounted by an axle 34 to each pocket 30 and the planetary gears 32, together, form a part of the planetary gear system 18. These planet gears 32 mesh with conventional gear ring 38 (FIG. 1) and the like which form the gearing system 16 so that rotation of the engine output shaft 12 is transmitted through the planetary gear arrangement 18 and the other components (not shown) of the gear system 16 to the shaft 20 and load 21.

Figure 3:
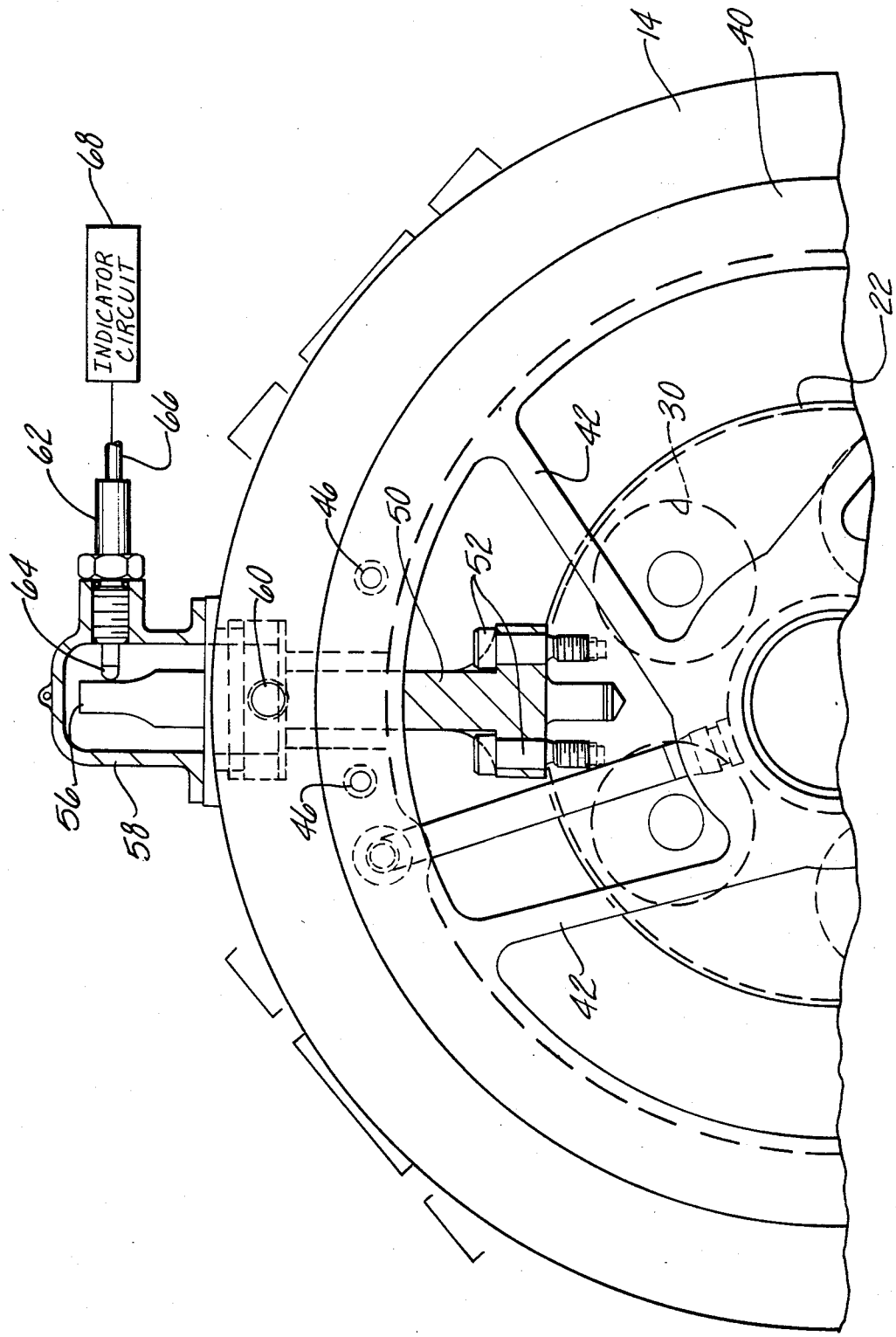
FIG. 3 is a view taken substantially along line 3—3 in FIG. 1 and enlarged for clarity.

With reference now particularly to FIGS. 3 and 4, the device of the present invention further comprises an annulus 40 which is coaxial with and spaced radially outwardly from the hub 22 adjacent its outer face 28. The hub 22 and annulus 40 are secured together by a plurality of circumferentially spaced spokes 42 extending from the annulus tangent to some circle coaxial to the hub. Preferably, the hub 22, annulus 40 and spokes 42 are of a one-piece construction.

With reference now particularly to FIGS. 2-4, the annulus 40 is both secured to and forms a part of the support for the gear box 14. Although any means can be used to secure the annulus 40 and gear box together, as shown in FIG. 3, a plurality of threaded fasteners 46 extend between the annulus 40 and gear box 14. Other means, such as a brazed or welded connection between the annulus 40 and gear box 14 can alternatively be used.

With reference now particularly to FIGS. 3 and 4, an elongated arm 50 is secured at one end to the hub 22 by fasteners 52 so that the arm 50 extends radially outwardly from the hub 22 and through an opening 54 (FIG. 4) formed in the gear box 14. The arm 50 is di-

UNITED STATES PATENT AND TRADEMARK OFFICE
CERTIFICATE OF CORRECTION

PATENT NO. : 4,542,658
DATED : September 24, 1985
INVENTOR(S) : Kenneth Dewey et al It is certified that error appears in the above—identified patent and that said Letters Patent are hereby corrected as shown below:

Claim 1, line 24 delete "sai" insert --said--.

Signed and Sealed this

Twenty-ninth Day of April 1986

[SEAL]

Attest:

DONALD J. QUIGG

Attesting Officer

Commissioner of Patents and Trademarks